Patented Aug. 18, 1936

2,051,507

UNITED STATES PATENT OFFICE 2,051,507

PROCESS OF REMOVING THE SIZE FROM TEXTILES OF ALL KINDS BY MEANS OF PANCREATIC AMYLASE

Wilhelm Wasmund, Darmstadt, Germany, assignor to Röhm & Haas Company, Philadelphia, Pa., a corporation of Pennsylvania No Drawing. Application March 22, 1935, Serial No. 12,532. In Germany March 22, 1934

6 Claims. (Cl. 195—2)

It is well known that the efficiency of pancreatic amylase can be greatly improved by various additions. Besides the various amino acids first mentioned by Sherman, Journal of American Chemical Society, vol. 43 pp. 2461 (1921), Journal of American Chemical Society, vol. 43 pp. 2469 (1921), Journal of American Chemical Society, vol. 44 pp. 2926 (1922), the chlorides of the alkalies and of alkaline earth, the phosphates of the alkalies and the soluble salts of calcium are known as favorably affecting the efficiency of pancreatic amylase.

I have found that the efficiency of pancreatic amylase can be improved by adding water-soluble salts of chromic acid, i. e. the chromates and/or bichromates, as potassium chromate, potassium bichromate, sodium bichromate and the like, particularly as applied to the process of removing the size from textiles of all kinds by means of pancreatic amylase.

The chromates and bichromates increase the thermostability of pancreatic amylase dissolved in water. By means of their strongly disinfecting properties, which are present already in rather low concentrations, they prevent that souring of the solutions used for removing the size, which is otherwise caused by the action of microorganisms and which would lead to inactivity of the pancreatic amylase during the process.

As compared to the phosphates which are also known as increasing the thermostability of pancreatic amylase dissolved in water, the chromates and bichromates are superior by their disinfecting properties and in that they do not form difficultly soluble compounds with the calcium salts which are always present in the solutions used for the process as they too are important for the thermostability of the pancreas amylase; the difficultly soluble compounds would make the solutions cloudy and stick to the textiles, they could not as a rule easily be washed off and would then prevent the textiles from becoming sufficiently smooth and soft.

As compared to other disinfecting additions, the chromates and bichromates are superior in that they are not only inoffensive to the activity of the pancreatic amylase but that they even strengthen the activity by their thermostabilizing properties. As the disinfecting properties of chromates and bichromates are very strong, only small proportions of them as compared to other disinfecting additions are necessary to prevent the solutions from becoming sour on account of the microorganisms.

As compared to other disinfecting additions, the chromates and bichromates are superior furthermore in that they may be mixed with the dry pancreas preparations without losing their stability. This is advantageous for industrial purposes. It is of course also possible to add the chromates and bichromates to the pancreatic amylase dissolved in water; they may also be added to the water before the pancreatic amylase is dissolved therein or at the same time.

It is often found in the textile industry that concentrated solutions of the medium to be used for removing the size from threads, fibers, tissues, fabrics, textures and the like are prepared, that they are then together with water added to the baths used for the process according to necessities in the course working. The same may be done with the pancreatic amylase prepared according to my invention in mixture with chromates and bichromates. In this case too the chromates or bichromates do not offend the enzymatic action of the pancreatic amylase.

It is also possible without any harm to add the chromates or bichromates to pancreas preparations mixed with other substances such as sodium chloride, phosphates or calcium salts, they do not hinder each other in their actions when they are dissolved and they do not altogether affect the stability of the stored enzymes.

*Example 1.*—5 parts of pancreatin are mixed with 15 parts of sodium chloride and 0,3 part of potassium chromate. 2 parts of this mixture (which may be stored for months without losing its activity) are dissolved in 1000 parts of water, which has been heated before to a temperature of 50° C. 250 parts by weight of the cloth from which the size shall be removed are put into the solution and left there for about 12 hours while the temperature of the solution is kept at 50° C., which may be done by applying heating coils. The cloth is then taken out and washed with water at a temperature of about 75° C. and proceeded with in the usual manner.

*Example 2.*—2 parts of a normal pancreas preparation for use in removing size from textiles are dissolved in 1000 parts of water, together with 0,06 part of potassium bichromate. The cloth, from which the size shall be removed, is then soaked in this solution which is held at a temperature of 50° C. and left so for 12 hours while care is taken to hinder evaporation, e. g. by covering the whole with a piece of cloth impermeable for water. The cloth is then washed and proceeded with as described in Example 1.

*Example 3.*—5 parts of the pancreas preparation mentioned in Example 2 and 0,12 part potassium bichromate are dissolved in 1000 parts of water. The solution is held at a temperature of 55° C. by means of heating and cooling coils which are fastened to the vessel in which the solution is prepared. The cloth is sprinkled with water of a temperature of about 85° C., pressed out and taken through the solution, then piled up, while care is taken to prevent evaporation and cooling off, e. g. by covering. The cloth is then proceeded with as described in the Examples 1 and 2.

Example 4.—0,07 part of sodium bichromate are dissolved in 1000 parts of water in a vat. The solution is left for 12 hours and then heated to 50° C.; therein then 2 parts of sodium chloride and 0,3 part of pancreatin are dissolved. The cloth is put into the solution after its having passed a wetting-out bath of 85° C. and a water bath of 20° C. The cloth is left in the solution for 6 hours, washed then in water of about 90° C. and proceeded with in the usual manner.

Example 5.—1 part of sodium chloride, 0,1 part of pancreatin, 0,06 part of potassium bichromate and 0,1 part of calcium acetate are dissolved in 500 parts of water. The solution is heated to 50° C. and 100 parts by weight of cloth are introduced. After 12 hours—while the temperature is kept at 50° C. the cloth is taken out and proceeded with as given in Example 1.

The examples are given by way of illustration not of limitation, any other methods may also be applied to my invention.

I claim:

1. In the process of removing the size from textiles of all kinds by means of pancreatic amylase the step which consists in incorporating water soluble salts of chromic acid in a bath containing amylase.

2. In the process of removing the size from textiles of all kinds by means of pancreatic amylase the adding of water soluble salts of chromic acid to pancreatic amylase and dissolving the whole in water.

3. In the process of removing the size from textiles of all kinds by means of pancreatic amylase the adding of water-soluble salts of chromic acid to a solution of pancreatic amylase and sodium chloride in water.

4. In the process of removing the size from textiles of all kinds by means of pancreatic amylase the adding of potassium chromate to a solution of pancreatic amylase and sodium chloride in water.

5. In the process of removing the size from textiles of all kinds by means of pancreatic amylase the adding of potassium bichromate to a solution of pancreatin in water.

6. In the process of removing the size from textiles of all kinds by means of pancreatic amylase the adding of sodium bichromate to a solution of pancreatin in water.

WILHELM WASMUND.